US010145509B2

(12) United States Patent
Nagura et al.

(10) Patent No.: US 10,145,509 B2
(45) Date of Patent: Dec. 4, 2018

(54) HYDROGEN STATION

(75) Inventors: Kenji Nagura, Hyogo (JP); Hitoshi Takagi, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 219 days.

(21) Appl. No.: 14/118,816

(22) PCT Filed: Jun. 28, 2012

(86) PCT No.: PCT/JP2012/004207
§ 371 (c)(1),
(2), (4) Date: Nov. 19, 2013

(87) PCT Pub. No.: WO2013/001824
PCT Pub. Date: Jan. 3, 2013

(65) Prior Publication Data
US 2014/0102587 A1    Apr. 17, 2014

(30) Foreign Application Priority Data

Jun. 30, 2011  (JP) ................................. 2011-146277

(51) Int. Cl.
*F17C 5/06*    (2006.01)
*H01M 8/04*    (2016.01)
(Continued)

(52) U.S. Cl.
CPC ............ *F17C 5/06* (2013.01); *B60L 11/1887* (2013.01); *H01M 8/04208* (2013.01);
(Continued)

(58) Field of Classification Search
CPC ................ F17C 5/06; F17C 2227/0337; F17C 3350/0478; F17C 2250/0626;
(Continued)

(56) References Cited

U.S. PATENT DOCUMENTS 3,642,036 A * 2/1972 Ginsburgh et al. ............. 141/94
4,558,573 A * 12/1985 La Monica ......... F04B 39/0207
62/473
(Continued)

FOREIGN PATENT DOCUMENTS

EP    2 049 828 A2    4/2009
JP    2001-355795 A   12/2001
(Continued)

OTHER PUBLICATIONS

International Search Report; PCT/JP2012/004207; dated Sep. 4, 2012.
(Continued)

*Primary Examiner* — Jason K Niesz
*Assistant Examiner* — James Hakomaki
(74) *Attorney, Agent, or Firm* — Studebaker & Brackett PC

(57) ABSTRACT

Provided is a hydrogen station that is used to charge hydrogen to a hydrogen tank mounted on a vehicle, the hydrogen station including: a compressor that compresses hydrogen; a lubricant cooling unit that cools the lubricant of the compressor while circulating the lubricant; a hydrogen cooling unit that is capable of cooling hydrogen which is not charged to the hydrogen tank mounted on the vehicle yet and is compressed by the compressor; a sensor that detects whether the vehicle approaches or reaches the hydrogen station; and a startup unit that starts up at least one of the lubricant cooling unit and the hydrogen cooling unit by a signal from the sensor.

4 Claims, 2 Drawing Sheets

(51) Int. Cl.
B60L 11/18 (2006.01)
H01M 8/04082 (2016.01)

(52) U.S. Cl.
CPC ............ *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0164* (2013.01); *F17C 2227/0185* (2013.01); *F17C 2227/0341* (2013.01); *F17C 2227/04* (2013.01); *F17C 2265/065* (2013.01); *F17C 2270/0178* (2013.01); *F17C 2270/0184* (2013.01); *Y02E 60/321* (2013.01); *Y02T 90/34* (2013.01)

(58) Field of Classification Search
CPC ...... F17C 2270/0139; F17C 2227/0157; F17C 2225/036; F17C 2221/012; F17C 2223/0123; F17C 2270/0184; F17C 2270/0185; F17C 2227/0185; F17C 2270/0178; F17C 2223/036; F17C 2227/0164; F17C 2225/0123; F17C 2227/0341; F17C 2265/065; F17C 2227/04; Y02E 60/321; Y02E 60/50; B60L 11/1887; H01M 8/04208
USPC ...................................... 141/192, 94, 105, 82
See application file for complete search history.

(56) References Cited

U.S. PATENT DOCUMENTS

| | | | | |
|---|---|---|---|---|
| 4,608,830 | A * | 9/1986 | Peschka et al. | 62/7 |
| 5,310,020 | A * | 5/1994 | Martin | F01M 5/02 |
| | | | | 184/104.1 |
| 5,365,981 | A * | 11/1994 | Peschka et al. | 141/7 |
| 5,419,155 | A * | 5/1995 | Boehde | F25B 1/047 |
| | | | | 62/470 |
| 5,671,786 | A * | 9/1997 | Corfitsen | 141/94 |
| 5,743,231 | A * | 4/1998 | Reinosa | F01M 5/02 |
| | | | | 123/196 S |
| 6,343,241 | B1 * | 1/2002 | Kohut et al. | 700/232 |
| 6,550,258 | B1 * | 4/2003 | Shoulders | F04C 28/06 |
| | | | | 62/472 |
| 6,655,342 | B1 * | 12/2003 | Wendels | F01M 1/20 |
| | | | | 123/196 R |
| 6,899,115 | B1 * | 5/2005 | Adler | F17C 5/06 |
| | | | | 137/13 |
| 7,168,464 | B2 * | 1/2007 | Diggins | 141/105 |
| 7,497,191 | B2 * | 3/2009 | Fulton et al. | 123/3 |
| 7,624,770 | B2 * | 12/2009 | Boyd | F17C 5/007 |
| | | | | 141/11 |
| 2002/0014277 | A1 | 2/2002 | Togasawa et al. | |
| 2003/0164202 | A1 * | 9/2003 | Graham et al. | 141/98 |
| 2005/0284154 | A1 * | 12/2005 | Peter | F17C 3/08 |
| | | | | 62/45.1 |
| 2006/0071016 | A1 * | 4/2006 | Diggins | F17C 7/02 |
| | | | | 222/3 |
| 2007/0227614 | A1 * | 10/2007 | Kurita et al. | 141/26 |
| 2008/0196384 | A1 * | 8/2008 | Ding | F17C 5/007 |
| | | | | 60/39.45 |
| 2009/0079388 | A1 * | 3/2009 | Reddy | B60L 11/1818 |
| | | | | 320/109 |
| 2010/0193294 | A1 * | 8/2010 | Hritz | F01M 5/02 |
| | | | | 184/6.3 |
| 2010/0307636 | A1 * | 12/2010 | Uemura | 141/4 |
| 2012/0125482 | A1 | 5/2012 | Mori | |
| 2012/0159970 | A1 * | 6/2012 | Reese | F17C 5/007 |
| | | | | 62/53.2 |
| 2012/0216915 | A1 * | 8/2012 | Takata et al. | 141/82 |
| 2013/0193918 | A1 * | 8/2013 | Sarkar | B60L 3/04 |
| | | | | 320/109 |

FOREIGN PATENT DOCUMENTS

| | | |
|---|---|---|
| JP | 2005-069327 A | 3/2005 |
| JP | 2006-220275 A | 8/2006 |
| JP | 2006-348752 A | 12/2006 |
| JP | 2010-216372 A | 9/2010 |
| JP | 2011-074925 A | 4/2011 |
| WO | 2008/017756 A2 | 2/2008 |
| WO | 2011/012937 A1 | 2/2011 |
| WO | 2011/048621 A1 | 4/2011 |

OTHER PUBLICATIONS

Written Opinion of the International Searching Authority; PCT/JP2012/004207; dated Sep. 4, 2012.

* cited by examiner

HYDROGEN STATION

TECHNICAL FIELD

The present invention relates to a hydrogen station that charges hydrogen to a fuel cell vehicle, a hydrogen vehicle, or the like.

BACKGROUND ART

In recent years, there have been concerns such as global warming and aerial pollution caused by carbon dioxide ($CO_2$), nitrogen oxide (NOX), and suspended particulate matter (PM) contained in an exhaust gas of an vehicle. For this reason, instead of an existing gasoline internal-combustion engine vehicle, a fuel cell vehicle (FCV) which is driven by using electric energy based on an oxidization reaction between hydrogen and oxygen in a fuel cell mounted on the vehicle has been gaining attention.

The fuel cell vehicle does not discharge any toxic matter in addition to the above-described carbon dioxide and the like. Further, the fuel cell vehicle has energy efficiency better than that of the gasoline internal-combustion engine vehicle. Likewise, the fuel cell vehicle has various advantages that may not be obtained from the gasoline internal-combustion engine vehicle.

Incidentally, the fuel cell vehicle may be largely classified into a type in which hydrogen is charged from a hydrogen station to the vehicle and a type in which a fuel other than hydrogen is charged to the vehicle and hydrogen is produced in a vehicle installed reforming unit. However, the former type has more advantages from the effect of a reduction of carbon dioxide ($CO_2$). Accordingly, there is a need to more actively study and develop the fuel cell vehicle and the hydrogen station that charges hydrogen to the fuel cell vehicle.

In a case of the fuel cell vehicle of the type in which hydrogen (hydrogen gas) is charged from the hydrogen station to the vehicle, compressed hydrogen is charged to a hydrogen tank mounted on the vehicle.

Incidentally, in a case where a gas is expanded while a difference in pressure thereof is maintained when a high-pressure gas of a supply source is transferred (that is, expanded) to a low-pressure state of a supply target, a change in temperature occurs in the gas due to the Joule-Thomson effect.

A change in temperature caused by the Joule-Thomson effect depends on the initial temperature of the gas. When the initial temperature is equal to or lower than the inversion temperature, the temperature of the gas decreases. Then, when the initial temperature is higher than the inversion temperature, the temperature of the gas increases. Here, the inversion temperature of the hydrogen is about 215 K (−58.15° C.). Since this inversion temperature is fairly lower than those of the other gases, when the hydrogen is generally charged to the hydrogen tank of the fuel cell vehicle or the like, an abrupt increase in temperature occurs in the charged hydrogen.

Accordingly, in the hydrogen station, there is a need for equipment or the like to suppress an abrupt increase in the temperature of the hydrogen when the hydrogen is charged to the hydrogen tank. Thus, various proposals have been suggested. For example, Patent Document 1 discloses a method of rapidly charging hydrogen to a hydrogen tank (and a hydrogen station that realizes the rapid hydrogen charging method), where the method includes: connecting a hydrogen supply source to a hydrogen tank and increasing a hydrogen charging speed in response to a pressure inside the hydrogen tank by a charging speed changing unit provided in a passage connecting the hydrogen supply source to the hydrogen tank.

Further, the hydrogen station includes a compressor (a high-pressure compressor) which compresses hydrogen in a high-pressure state so as to supply the compressed hydrogen to a fuel cell vehicle or the like. The compressor is activated when the hydrogen is supplied (charged) to the fuel cell vehicle or the like in the hydrogen station.

In this way, since the hydrogen is supplied after the unit such as the compressor is activated (started up) in the hydrogen station, it takes some time until the supply of the hydrogen is actually started after an order to start up the supply of the hydrogen is received.

Therefore, a case may be supposed in which all units of the hydrogen station including the compressor are activated (started up) before the order to start up the supply of the hydrogen to the fuel cell vehicle or the like is received, but in this case, power consumption increases.

CITATION LIST

Patent Document

Patent Document 1: JP 2001-355795 A

SUMMARY OF THE INVENTION

An object of the present invention is to provide a hydrogen station capable of charging hydrogen to a fuel cell vehicle, a hydrogen vehicle, or the like and shortening a time necessary until the supply of the hydrogen is actually started after the supply of the hydrogen to the fuel cell vehicle, the hydrogen vehicle, or the like is ordered while suppressing an increase in power consumption.

According to an aspect of the present invention, there is provided a hydrogen station that is used to charge hydrogen to a hydrogen tank mounted on a vehicle, the hydrogen station including: a compressor that compresses hydrogen; a lubricant cooling unit that cools the lubricant of the compressor while circulating the lubricant; a hydrogen cooling unit that is able to cool hydrogen which is not charged to the hydrogen tank mounted on the vehicle yet and is compressed by the compressor; a sensor that detects whether the vehicle approaches or reaches the hydrogen station; and a startup unit that starts up at least one of the lubricant cooling unit and the hydrogen cooling unit by a signal from the sensor.

DESCRIPTION OF EMBODIMENTS

Figure 1:
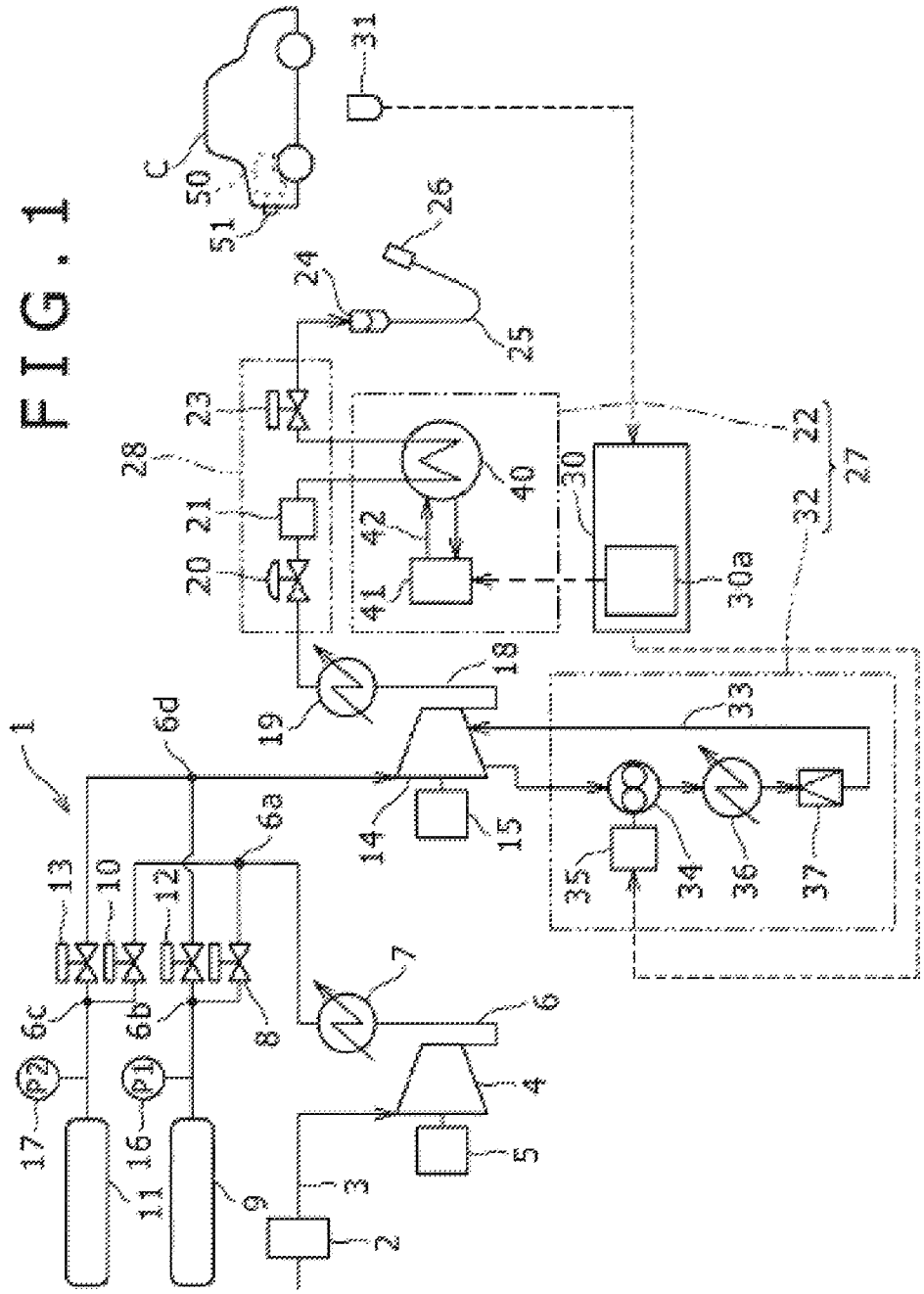
FIG. 1 is a schematic diagram illustrating a configuration of a hydrogen station according to an embodiment of the present invention.

Hereinafter, embodiments of the present invention will be described in detail by referring to the drawings. FIG. 1 is a schematic diagram illustrating a configuration of a hydrogen station 1 according to this embodiment.

The hydrogen station 1 is a stationary facility that is used to charge hydrogen to a hydrogen tank 50 mounted on a fuel cell vehicle (hereinafter, simply referred to as a vehicle) C.

In the hydrogen station 1, the hydrogen is supplied from a hydrogen supply source (not illustrated) to a low-pressure-stage reciprocating compressor 4 through a supply passage 3. A filter 2 is provided in the supply passage 3. A driving machine (a motor or the like) 5 is connected to the low-pressure-stage reciprocating compressor 4. The low-pressure-stage reciprocating compressor 4 is driven by the rotation of the driving machine 5.

The low-pressure-stage reciprocating compressor 4 is connected to a high-pressure-stage reciprocating compressor (a most high-pressure-stage compressor) 14 to be described later by an intermediate passage 6. The low-pressure-stage reciprocating compressor 4 discharges the compressed hydrogen to the intermediate passage 6. The discharge pressure of the low-pressure-stage reciprocating compressor 4 at this time is controlled at, for example, 40 MPa. A hydrogen cooler 7 is provided in the intermediate passage 6. The hydrogen cooler 7 cools the hydrogen which is compressed by the low-pressure-stage reciprocating compressor 4 so that the temperature thereof increases. The intermediate passage 6 is branched at a branch point 6a. One intermediate passage 6 which is branched at the branch point 6a is connected to a first intermediate pressure accumulator 9 through a branch point 6b. An opening and closing valve 8 is provided in the one intermediate passage 6. Further, the other intermediate passage 6 which is branched at the branch point 6a is connected to a second intermediate pressure accumulator 11 through a branch point 6c. An opening and closing valve 10 is provided in the other intermediate passage 6. The one intermediate passage 6 which extends from the first intermediate pressure accumulator 9 through the branch point 6b and the other intermediate passage 6 which extends from the second intermediate pressure accumulator 11 through the branch point 6c are joined to each other at a junction point 6d. The intermediate passage 6 which is joined at the junction point 6d is connected to a high-pressure-stage reciprocating compressor 14.

An opening and closing valve 12 is provided in the one intermediate passage 6 between the branch point 6b and the junction point 6d. Further, an opening and closing valve 13 is provided in the other intermediate passage 6 between the branch point 6c and the junction point 6d. Further, a pressure sensor 16 is provided in the one intermediate passage 6 between the branch point 6b and the first intermediate pressure accumulator 9. Further, a pressure sensor 17 is provided in the other intermediate passage 6 between the branch point 6c and the second intermediate pressure accumulator 11.

A driving machine 15 is connected to the high-pressure-stage reciprocating compressor 14. The high-pressure-stage reciprocating compressor 14 is driven by the rotation of the driving machine 15. The driving machine 15 is a motor of which the rotation number is controlled by an inverter (not illustrated), and is rotatable at an arbitrary rotation number. Furthermore, the driving machine 15 is not limited to the motor of which the rotation is controlled by the inverter as long as the rotation number may be controlled.

The first intermediate pressure accumulator 9 and the second intermediate pressure accumulator 11 first accumulate the hydrogen supplied from the low-pressure-stage reciprocating compressor 4.

The opening and closing valve 8 is opened when a detection pressure P1 of the pressure sensor 16 is lower than a predetermined first threshold value and is closed when the detection pressure P1 of the pressure sensor 16 is equal to or higher than the predetermined first threshold value. The opening and closing operation (particularly, the closing operation) of the opening and closing valve 8 prevents a state in which the amount of the hydrogen supplied from the low-pressure-stage reciprocating compressor 4 increases too much so that the internal pressure of the first intermediate pressure accumulator 9 excessively increases.

The opening and closing valve 10 is opened when a detection pressure P2 of the pressure sensor 17 is lower than a predetermined second threshold value and is closed when the detection pressure P2 of the pressure sensor 17 is equal to or higher than the predetermined second threshold value. The opening and closing operation (particularly, the closing operation) of the opening and closing valve 10 prevents a state in which the amount of the hydrogen supplied from the low-pressure-stage reciprocating compressor 4 increases too much so that the internal pressure of the second intermediate pressure accumulator 11 excessively increases.

The opening and closing valve 12 is closed when the detection pressure P1 of the pressure sensor 16 is lower than a predetermined third threshold value and is opened when the detection pressure P1 of the pressure sensor 16 is equal to or higher than the predetermined third threshold value. The opening and closing operation of the opening and closing valve 12 prevents a state in which the pressure of the hydrogen supplied to the high-pressure-stage reciprocating compressor 14 excessively decreases.

The opening and closing valve 13 is closed when the detection pressure P2 of the pressure sensor 17 is lower than a predetermined fourth threshold value and is opened when the detection pressure P2 of the pressure sensor 17 is equal to or higher than the predetermined fourth threshold value. The opening and closing operation of the opening and closing valve 13 prevents a state in which the pressure of the hydrogen supplied to the high-pressure-stage reciprocating compressor 14 excessively decreases.

The high-pressure-stage reciprocating compressor 14 discharges the compressed hydrogen to a discharge passage 18. The discharge pressure of the high-pressure-stage reciprocating compressor 14 at this time is controlled at, for example, 100 MPa. A hydrogen cooler 19 is provided in the discharge passage 18. The hydrogen cooler 19 cools the hydrogen which is compressed by the high-pressure-stage reciprocating compressor 14 so that the temperature thereof increases.

The high-pressure-stage reciprocating compressor 14 is connected with a lubricant cooling unit 32 which cools the lubricant inside the reciprocating compressor 14 while circulating the lubricant. The lubricant cooling unit 32 includes an oil circulation passage 33, a lubricant pump 34 which is provided in the oil circulation passage 33, an oil cooler 36, an oil filter 37, and a driving machine 35 which drives the lubricant pump 34. Then, the lubricant cooling unit 32 is started up by receiving a startup signal from a startup unit 30a inside a controller 30 to be described later. Thus, the lubricant inside the high-pressure-stage reciprocating compressor 14 is cooled while being circulated between the reciprocating compressor 14 and the lubricant cooling unit 32. Furthermore, the lubricant cooling unit 32 may be provided in not only the high-pressure-stage reciprocating compressor 14 but also the low-pressure-stage reciprocating compressor 4.

The discharge passage 18 at the downstream side of the hydrogen cooler 19 is provided with a flow rate adjustment valve 20, a flow meter 21, a hydrogen cooling unit 22, and an interruption valve 23 which are disposed in this order. The flow rate adjustment valve 20 controls the opening degree thereof based on the flow rate value detected by the downstream flow meter 21. Thus, the flow rate of the hydrogen passing through the flow rate adjustment valve 20 is appropriately adjusted. Furthermore, the flow rate adjustment valve 20, the flow meter 21, and the interruption valve 23 are assembled in a so-called dispenser (charger) 28 so as to constitute a part thereof.

The hydrogen cooling unit 22 includes a hydrogen cooler 40 and a cooler 41. The hydrogen cooler 40 and the cooler 41 are connected to each other by a cooling medium pipe 42. The hydrogen cooling unit 22 is configured to cause a heat exchange between the hydrogen inside the discharge passage 18 and the cooling medium cooled by the cooler 41 inside the hydrogen cooler 40. Then, in the hydrogen cooling unit 22, the cooler 41 is started up by receiving the startup signal from the startup unit 30a inside the controller 30. Thus, the hydrogen inside the discharge passage 18 is cooled by the cooling medium which is circulated between the hydrogen cooler 40 and the cooler 41 inside the hydrogen cooler 40.

The hydrogen coolers 7 and 19 also respectively include the hydrogen cooling unit like the hydrogen cooler 40.

The hydrogen cooling unit 22 at the final stage (that is, the most downstream side of the hydrogen station 1) further cools the hydrogen, which is cooled by the hydrogen cooling unit (the hydrogen cooling unit including the hydrogen cooler 19) at the upstream side of the hydrogen cooling unit 22, immediately before the hydrogen is charged to a customer's vehicle C. For example, the hydrogen cooling unit including the hydrogen cooler 19 cools the high-temperature hydrogen of about 130° C. to about 40° C., and the hydrogen cooling unit 22 cools the hydrogen cooled at about 40° C. to about −40° C.

An emergency detaching coupler 24 is provided at the most downstream end of the discharge passage 18. The emergency detaching coupler 24 is detached when a charging hose 25 extending to the vehicle C through the emergency detaching coupler is pulled by an extremely strong force (specifically, the coupler is separated at the intermediate portion), so that the high-pressure hydrogen gas is not ejected from both a portion on the side of the hydrogen gas supply target (the vehicle C) of the detached emergency detaching coupler 24 and a portion on the side of the hydrogen gas supply source of the detached emergency detaching coupler 24.

A charging nozzle 26 is provided at the most downstream end of the charging hose 25 extending from the emergency detaching coupler 24. The charging nozzle 26 is connected to a nozzle port 51 of the vehicle C. Then, the hydrogen which is supplied from the hydrogen station 1 is supplied to the in-vehicle hydrogen tank 50 mounted on the vehicle C through the nozzle port 51 connected to the charging nozzle 26.

In the hydrogen station 1, a lane (not illustrated) is set so as to guide the visited customer's vehicle C (approaching or reaching the hydrogen station 1) to the hydrogen gas supply position. A sensor 31 which detects the visiting (the approaching or the reaching of the vehicle C with respect to the hydrogen station 1) of the vehicle C on which the customer gets is provided near the entrance of the lane.

In the hydrogen station 1 of this embodiment, the unit provided after the high-pressure-stage reciprocating compressor 14 constitutes a startup preparation unit 27. The startup preparation unit 27 of this embodiment includes the lubricant cooling unit 32 and the hydrogen cooling unit 22. Further, the startup preparation unit 27 is started up by receiving a startup signal from the startup unit 30a inside the controller 30. Furthermore, the startup unit 30a outputs the startup signal by receiving a signal (hereinafter, referred to as a "visiting signal") from the sensor 31.

The sensor 31 of this embodiment is configured as, for example, at least one of an optical sensor, a weight sensor, and a magnetic sensor. For example, when the sensor 31 is configured only as an optical sensor such as a phototube, there is a case in which it is difficult to determine whether the customer's vehicle C or the person passes by the front side of the sensor 31. However, for example, when the sensor 31 is configured as an optical sensor and a weight sensor or a magnetic sensor, it is possible to determine whether the vehicle C or the person passes by the front side of the sensor 31.

Next, described are the operation state of the hydrogen station 1 before the customer visits the hydrogen station and the operation state of the hydrogen station 1 when the vehicle C on which the customer gets visits the hydrogen station 1.

The hydrogen station 1 first receives the hydrogen into the low-pressure-stage reciprocating compressor 4 from a hydrogen supply source (not illustrated) through the supply passage 3 provided with the filter 2. Then, the driving machine 5 connected to the low-pressure-stage reciprocating compressor 4 is started up so that the low-pressure-stage reciprocating compressor 4 is driven. Subsequently, the low-pressure-stage reciprocating compressor 4 ejects the compressed hydrogen to the intermediate passage 6, and the hydrogen cooler 7 cools the hydrogen ejected from the low-pressure-stage reciprocating compressor 4.

The cooled hydrogen flows through the intermediate passage 6, sequentially flows through the branch point 6a, the opened opening and closing valve 8, and the branch point 6b so as to flow into the first intermediate pressure accumulator 9, and sequentially flows through the branch point 6a, the opened opening and closing valve 10, and the branch point 6c so as to flow into the second intermediate pressure accumulator 11.

At this time, when the detection pressure P1 of the pressure sensor 16 is equal to or higher than the predetermined first threshold value, the opening and closing valve 8 is closed so that the accumulation of the hydrogen into the first intermediate pressure accumulator 9 is stopped. Further, when the detection pressure P2 of the pressure sensor 17 is equal to or higher than the predetermined second threshold value, the opening and closing valve 10 is closed so that the accumulation of the hydrogen into the second intermediate pressure accumulator 11 is stopped.

When the detection pressure P1 of the pressure sensor 16 is equal to or higher than the predetermined third threshold value, the opening and closing valve 12 is opened. Then, when the detection pressure P2 of the pressure sensor 17 is equal to or higher than the predetermined fourth threshold value, the opening and closing valve 13 is opened. Thus, the hydrogen accumulated in the first intermediate pressure accumulator 9 and the hydrogen accumulated in the second intermediate pressure accumulator 11 respectively flow out of any one of or both the first intermediate pressure accumulator 9 and the second intermediate pressure accumulator 11, are joined to each other at the junction point 6d, pass through the high-pressure-stage reciprocating compressor 14 and the hydrogen cooler 19 which are not started up, and reach a position directly before the dispenser 28 of the discharge passage 18. Thus, the hydrogen is fully charged into the passage from the first intermediate pressure accumulator 9 and the second intermediate pressure accumulator 11 to the position directly before the dispenser 28.

Then, when the vehicle C on which the customer gets enters the entrance of the lane, the sensor 31 detects the visiting of the vehicle C and transmits a visiting signal to the controller 30. Thus, the startup unit 30a inside the controller 30 transmits the startup signal to each of the lubricant cooling unit 32 and the hydrogen cooling unit 22. Then, the hydrogen cooling unit 22 cools the hydrogen directly before charged to the customer's vehicle C so that the hydrogen cooling state does not cause any problem even when the hydrogen is charged at any time. That is, the hydrogen cooling unit 22 cools the hydrogen inside the hydrogen cooling unit 22 among the hydrogen accumulated inside the discharge passage 18 so that the hydrogen becomes the cooling state before the hydrogen is charged to the customer's vehicle C.

When the lubricant cooling unit 32 receives the startup signal, the driving machine 35 of the lubricant cooling unit 32 is started up, so that the lubricant inside the high-pressure-stage reciprocating compressor 14 is circulated between the lubricant cooling unit 32 and the high-pressure-stage reciprocating compressor 14. At this time, the circulated lubricant is cooled by the oil cooler 36 in the lubricant cooling unit 32 so that impurities are removed therefrom by the oil filter 37, and is returned from the lubricant cooling unit 32 to the reciprocating compressor 14. In this way, this operation is repeated. Thus, the high-pressure-stage reciprocating compressor 14 is kept in a lubrication state that does not cause any problem even when the high-pressure-stage reciprocating compressor is started up at any time. Further, when the hydrogen cooling unit 22 receives the startup signal, the cooler 41 of the hydrogen cooling unit 22 is started up, so that the sufficiently cooled cooling medium is circulated between the cooler 41 and the hydrogen cooler 40. Thus, the operation state (for example, the operation state in which the hydrogen of about 40° C. may be cooled to about −40° C.) of the hydrogen cooling unit 22 is kept in which the hydrogen cooler 40 may sufficiently cool the hydrogen passing through the hydrogen cooler 40 even when the hydrogen is charged at any time.

At the time point in which the customer's vehicle C visits the hydrogen gas supply position, the customer orders the charging of the hydrogen, and the charging nozzle 26 is connected to the nozzle port 51 of the vehicle C (that is, the time point in which the charging of the hydrogen to the vehicle C is ordered), an operator of the hydrogen station 1 instructs the controller 30 to activate the driving machine 15 of the high-pressure-stage reciprocating compressor 14. At this time, the controller 30 also starts up the other units (the units involving with the charging of the hydrogen to the vehicle C) of the hydrogen station 1. Thus, the low-pressure hydrogen is compressed to a high pressure by the high-pressure-stage reciprocating compressor 14 and the high-pressure hydrogen ejected from the reciprocating compressor 14 to the discharge passage 18 is cooled by the hydrogen cooler 19.

Subsequently, the operator opens the interruption valve 23 of the dispenser 28. Thus, the hydrogen is supplied to the hydrogen tank 50 mounted on the vehicle C. At this time, the flow rate adjustment valve 20 appropriately keeps the flow rate of the hydrogen passing through the flow rate adjustment valve 20 based on the flow rate value detected by the flow meter 21. Further, since the hydrogen cooling unit 22 is started up before the customer orders the charging of the hydrogen, the sufficiently cooled hydrogen may be directly charged to the vehicle C. That is, the time necessary until the charging of the hydrogen starts after the charging of the hydrogen is ordered and the time necessary until the charging of the hydrogen ends are shortened compared to the case where the hydrogen cooling unit 22 is started up after the order of the charging of the hydrogen is received.

As described above, the hydrogen station 1 of this embodiment includes plural reciprocating compressors 4 and 14 which compress the hydrogen supplied thereto in plural stages and the sensor 31 which detects the visiting (the approaching or the reaching with respect to the hydrogen station 1) of the customer's vehicle C. Further, in the hydrogen station 1, the units 22 and 32 provided after the high-pressure-stage reciprocating compressor 14 among the plural stages of reciprocating compressors 4 and 14 constitute the startup preparation unit 27. Further, the hydrogen station 1 includes the startup unit 30a which starts up the startup preparation unit 27 by the visiting signal from the sensor 31. For this reason, the hydrogen station 1 of this embodiment may shorten the time necessary until the charging of the hydrogen to the customer's vehicle C starts after the customer orders the charging of the hydrogen (the charging of the hydrogen to the vehicle C is ordered) and the time necessary until the charging of the hydrogen ends.

Further, when all relevant units are started up in advance until the supply (the charging) of the hydrogen is actually started after the approaching or the reaching of the vehicle C with respect to the hydrogen station is detected, much power is consumed. Therefore, in the hydrogen station 1 of this embodiment, the unit (the startup target) that is started up by the startup unit 30a in accordance with the detection of the vehicle C is narrowed (limited) to a part of units. That is, the startup target is narrowed to the unit that is particularly effective for the object in which the driving power consumption is not so large and the time necessary until the supply (the charging) of the hydrogen starts after the order of the supply (the charging) of the hydrogen is extremely shortened. The startup target of this embodiment indicates the lubricant cooling unit 32 and the hydrogen cooling unit 22. Accordingly, at the time point in which the approaching or the reaching of the vehicle C with respect to the hydrogen station is detected, the high-pressure-stage reciprocating compressor 14 is not started up, but only the lubricant cooling unit 32 and the hydrogen cooling unit 22 are started up.

Thus, the hydrogen station 1 shortens the time necessary until the supply of the hydrogen is actually started after the supply of the hydrogen to the vehicle C is ordered while suppressing an increase in power consumption.

The hydrogen station according to the present invention is not limited to the above-described embodiment. For example, the startup preparation unit 27 of the above-described embodiment includes both units 32 and 22 provided after the high-pressure-stage reciprocating compressor 14, but the startup preparation unit may include only one of the units 32 and 22. Further, the startup preparation unit may include a unit similar to the units 32 and 22 provided after the high-pressure-stage reciprocating compressor 14.

Figure 2:
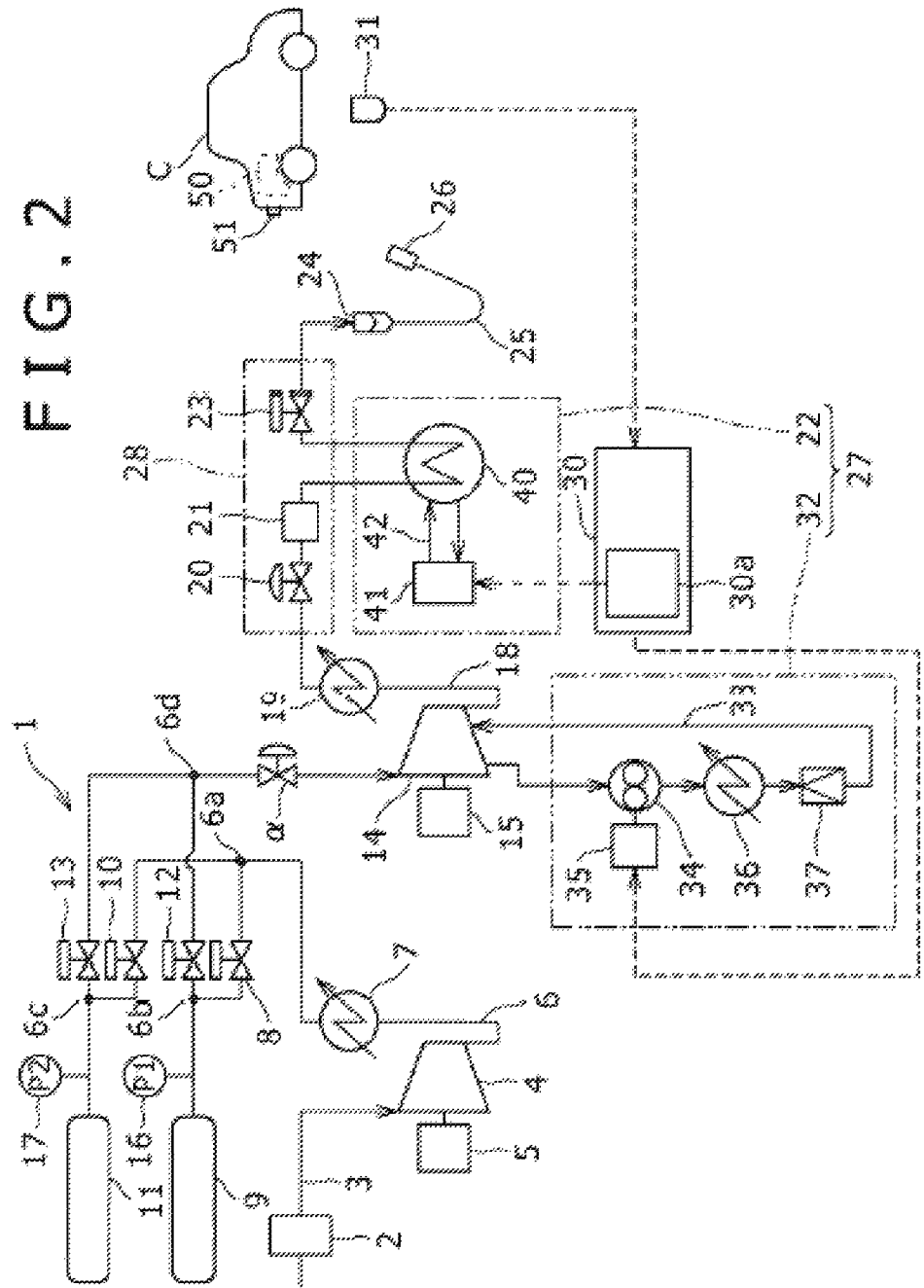
FIG. 2 is a schematic diagram illustrating a configuration of a hydrogen station according to another embodiment of the present invention.

Further, the startup preparation unit 27 may include not only the unit provided after the high-pressure-stage reciprocating compressor 14 but may also include a unit provided after the intermediate passage 6. For example, a modified example of the above-described embodiment will be described. As illustrated in FIG. 2, an opening and closing valve α is provided in the intermediate passage 6 between the junction point 6d and the high-pressure-stage reciprocating compressor 14, and the startup preparation unit 27 may include the opening and closing valve α. In this case, desirably, the controller 30 performs a control so that the opening and closing valve α is opened when the controller receives the visiting signal from the sensor 31 and the opening and closing valve α is closed at the other time (in which the controller does not receive the visiting signal).

Further, in the hydrogen station 1 of the above-described embodiment, the compressors 4 and 14 are not limited to the reciprocating compressors, but may be different compressors.

Further, the hydrogen station 1 of the above-described embodiment is provided with two compressors 4 and 14, but the present invention is not limited to this number. For example, one or three or more compressors may be provided. When three or more compressors are provided, the lubricant cooling unit 32 is provided in at least the most downstream compressor.

In the hydrogen station 1 of the above-described embodiment, two intermediate pressure accumulators (the first intermediate pressure accumulator 9 and the second intermediate pressure accumulator 11) are provided and the intermediate passage 6 is branched at the branch point 6a so as to be connected to the two intermediate pressure accumulators 9 and 11. However, the present invention is not limited to this configuration. For example, a configuration may be employed in which the hydrogen station is provided with only one intermediate pressure accumulator and the intermediate passage 6 is connected to the intermediate pressure accumulator.

Outline of Embodiment

The above-described embodiments are summarized as below.

That is, the hydrogen station of the above-described embodiment is a hydrogen station that is used to charge hydrogen to a hydrogen tank mounted on a vehicle, the hydrogen station including: a compressor that compresses hydrogen; a lubricant cooling unit that cools the lubricant of the compressor while circulating the lubricant; a hydrogen cooling unit that is able to cool hydrogen which is not charged to the hydrogen tank mounted on the vehicle yet and is compressed by the compressor; a sensor that detects whether the vehicle approaches or reaches the hydrogen station; and a startup unit that starts up at least one of the lubricant cooling unit and the hydrogen cooling unit by a signal from the sensor.

According to this configuration, it is possible to shorten the time necessary until the supply of the hydrogen is actually started after the supply of the hydrogen to the fuel cell vehicle or the hydrogen vehicle is ordered while suppressing an increase in power consumption.
Specifically, the configuration is as below.

Since the driving machine of the lubricant cooling unit is started up so that the lubricant inside the high-pressure-stage reciprocating compressor is circulated between the lubricant cooling unit and the high-pressure-stage reciprocating compressor, the high-pressure-stage reciprocating compressor becomes a lubrication state that does not cause any problem even when the high-pressure-stage reciprocating compressor is activated at any time. Further, since the cooler of the hydrogen cooling unit is started up so that the sufficiently cooled cooling medium is circulated between the cooler and the hydrogen cooler, the hydrogen cooling unit becomes an operation state in which the hydrogen cooler may sufficiently cool the hydrogen passing through the hydrogen cooler even when the charging of the hydrogen starts at any time. Therefore, since the startup unit detects the approaching or the reaching of the fuel cell vehicle or the like with respect to the hydrogen station by the sensor so that at least one of the lubricant cooling unit and the hydrogen cooling unit is started up in advance, the compressor becomes the lubrication state and/or the hydrogen cooling unit becomes the operation state before the supply of the hydrogen is ordered. Accordingly, compared to the case where the lubricant cooling unit and the hydrogen cooling unit are started up (activated) after the supply of the hydrogen to the fuel cell vehicle is ordered, it is possible to shorten the time necessary until the hydrogen is actually supplied after the supply of the hydrogen to the fuel cell vehicle or the like is ordered.

Further, in the hydrogen station with the above-described configuration, the startup target which is started up by the startup unit when the sensor detects the approaching or the reaching of the fuel cell vehicle or the like with respect to the hydrogen station is narrowed to a part of units (the unit in which the driving power consumption is not so large, and which is particularly effective for the object that the time necessary until the supply (the charging) of the hydrogen starts after the order of the supply (the charging) of the hydrogen is extremely shortened). Thus, the hydrogen station shortens the time necessary until the supply of the hydrogen is actually started after the supply of the hydrogen to the fuel cell vehicle or the hydrogen vehicle is ordered while suppressing an increase in power consumption.

Further, when the compressors are provided in plural stages in the hydrogen station, it is desirable that the startup unit start the lubricant cooling unit provided in the most downstream compressor.

Since the most downstream compressor is activated only before, during and after the time in which the hydrogen is supplied to the vehicle or the like, the time necessary for cooling the lubricant is limited thereto. Accordingly, in this configuration, since the lubricant cooling unit of the most downstream compressor is not activated when the cooling operation is not needed, the energy may be saved and the lifetime of the lubricant cooling unit may be extended.

Further, in a case where the hydrogen cooling unit is provided in plural stages in the hydrogen station, it is desirable that the startup unit start up the most downstream hydrogen cooling unit among the plural stages of hydrogen cooling units.

INDUSTRIAL APPLICABILITY

The present invention provides a hydrogen station.
The invention claimed is:
1. A hydrogen station that is used to charge hydrogen to a hydrogen tank mounted on a vehicle, the hydrogen station comprising:
   a dispenser for dispensing hydrogen to a hydrogen tank mounted on a vehicle;
   a hydrogen flow passage extending from a hydrogen supply source to the dispenser;
   a first compressor provided at an upstream position of the hydrogen flow passage for compressing hydrogen supplied from the hydrogen supply source at a first pressure;
   a second compressor provided at a downstream of the first compressor for compressing the hydrogen at a second pressure higher than the first pressure;
   a lubricant cooling unit for cooling a lubricant for use in the second compressor, the lubricant cooling unit including:
      an oil circulating passage whose outflow end and inflow end are connected with the second compressor;

a lubricant pump provided at an intermediate position of the oil circulating passage for pumping lubricant to flow through the circulating passage and the second compressor; and an oil cooler provided on the oil circulating passage at a downstream of the lubricant pump for cooling the lubricant before flowing into the second compressor;

a hydrogen cooling unit provided at a downstream of the second compressor for cooling the hydrogen contained in the dispenser;

a sensor provided at a specified position of the hydrogen station to detect whether the vehicle approaches or reaches the hydrogen station and output a detection signal indicative of the vehicle approaching or reaching;

a controller connected with the sensor for controlling respective operations of the first compressor, the second compressor, the lubricant pump, and the hydrogen cooling unit in such a way that:

the compressed hydrogen fills the hydrogen flow passage and the dispenser with the operation of the second compressor, the lubricant pump, and the hydrogen cooling unit being suspended before receiving the detection signal from the sensor; and the lubricant pump starts the circulating of the lubricant to cool the lubricant by the oil cooler, and the hydrogen cooling unit starts the cooling of the compressed hydrogen in the dispenser when receiving the detection signal.

2. The hydrogen station according to claim 1, further comprising:

an intermediate pressure accumulator connected to the hydrogen flow passage via a branch point between the first compressor and the second compressor; and a valve provided between the branch point and the second compressor, the valve being controlled by the controller to control the flow of hydrogen to the second compressor.

3. The hydrogen station according to claim 1, further comprising another hydrogen cooling unit between the first compressor and the second compressor.

4. The hydrogen station according to claim 1, wherein the second compressor is a single reciprocating type compressor driven by a motor.

* * * * *